US012160059B2

(12) United States Patent
Mamuro et al.

(10) Patent No.: US 12,160,059 B2
(45) Date of Patent: Dec. 3, 2024

(54) CONNECTOR INCLUDING MULTIPLE TERMINALS HAVING DIFFERENT SIZES

(71) Applicant: Murata Manufacturing Co., Ltd., Kyoto-fu (JP)

(72) Inventors: Minoru Mamuro, Nagaokakyo (JP); Yuma Amemori, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 360 days.

(21) Appl. No.: 17/714,834

(22) Filed: Apr. 6, 2022

(65) Prior Publication Data

US 2022/0231439 A1 Jul. 21, 2022

Related U.S. Application Data

(63) Continuation of application No. PCT/JP2020/037675, filed on Oct. 5, 2020.

(30) Foreign Application Priority Data

Oct. 18, 2019 (JP) ................................ 2019-191554

(51) Int. Cl.
*H01R 12/00* (2006.01)
*H01R 12/71* (2011.01)
(Continued)

(52) U.S. Cl.
CPC ....... *H01R 12/716* (2013.01); *H01R 13/2407* (2013.01); *H01R 13/405* (2013.01); *H01R 13/629* (2013.01); *H01R 13/642* (2013.01)

(58) Field of Classification Search
CPC ......................... H01R 12/716; H01R 13/2407; H01R 13/405; H01R 13/642; H01R 13/629
(Continued)

(56) References Cited

U.S. PATENT DOCUMENTS 7,074,085 B2 * 7/2006 Chen .................... H01R 13/658 439/108
7,367,816 B2 * 5/2008 Liu ........................ H01R 13/26 439/74
(Continued)

FOREIGN PATENT DOCUMENTS

JP 2013-232372 A 11/2013
JP 2016-189244 A 11/2016
(Continued)

OTHER PUBLICATIONS

International Search Report issued in PCT/JP2020/037675; mailed Oct. 27, 2020.

*Primary Examiner* — Abdullah A Riyami
*Assistant Examiner* — Vladimir Imas
(74) *Attorney, Agent, or Firm* — Studebaker & Brackett PC

(57) ABSTRACT

In a connector, first, second, third and fourth terminals are disposed to satisfy conditions (A) and (B): (A) (a1) a left-end of the first terminal is positioned to left of a left-end of the fourth terminal, and a distance between the left-end of the first terminal and the left-end of the fourth terminal in a left-right direction is shorter than a first distance, or (a2) the left-end of the first terminal coincides with the left-end of the fourth terminal in the left-right direction, (B) (b1) a right-end of the second terminal is positioned to left of a right-end of the third terminal, and a distance between the right-end of the second terminal and the right-end of the third terminal in the left-right direction is shorter than a second distance, or (b2) the right-end of the second terminal coincides with the right-end of the third terminal in the left-right direction.

20 Claims, 7 Drawing Sheets

(51) Int. Cl.

| | |
|---|---|
| ***H01R 13/24*** | (2006.01) |
| ***H01R 13/405*** | (2006.01) |
| ***H01R 13/629*** | (2006.01) |
| ***H01R 13/642*** | (2006.01) |

(58) Field of Classification Search

USPC .............................................................. 439/74

See application file for complete search history.

(56) References Cited

U.S. PATENT DOCUMENTS

| | | | | |
|---|---|---|---|---|
| 8,758,064 | B2 * | 6/2014 | Nagase | H01R 24/60<br>439/676 |
| 9,153,892 | B2 * | 10/2015 | Tanaka | H01R 13/04 |
| 9,178,309 | B2 * | 11/2015 | Tanaka | H01R 13/631 |
| 9,450,340 | B2 * | 9/2016 | Uratani | H01R 13/6585 |
| 10,811,824 | B2 * | 10/2020 | Teruki | H01R 13/6585 |
| 10,985,499 | B2 * | 4/2021 | Miyamoto | H01R 13/6275 |
| 11,005,200 | B2 * | 5/2021 | Ashibu | H01R 12/716 |
| 11,011,874 | B2 * | 5/2021 | Kitazawa | H01R 12/716 |
| 11,557,846 | B2 * | 1/2023 | Takagi | H01R 12/716 |
| 2013/0149908 | A1 * | 6/2013 | Little | H01R 12/716<br>439/660 |
| 2018/0198241 | A1 * | 7/2018 | Ooi | H01R 13/6597 |
| 2019/0280409 | A1 * | 9/2019 | Hoshiba | H01R 12/716 |
| 2023/0042553 | A1 * | 2/2023 | Someya | H01R 13/405 |

FOREIGN PATENT DOCUMENTS

| | | | |
|---|---|---|---|
| JP | 2018-198216 | A | 12/2018 |
| WO | 2016/021176 | A1 | 2/2016 |
| WO | 2017/188054 | A1 | 11/2017 |

* cited by examiner

CONNECTOR INCLUDING MULTIPLE TERMINALS HAVING DIFFERENT SIZES

CROSS-REFERENCE TO RELATED APPLICATIONS

This application claims benefit of priority to International Patent Application No. PCT/JP2020/037675, filed Oct. 5, 2020, and to Japanese Patent Application No. 2019-191554, filed Oct. 18, 2019, the entire contents of each are incorporated herein by reference.

BACKGROUND

Technical Field

The present disclosure relates to a connector including multiple terminals having different sizes.

Background Art

As a disclosure related to a connector in the past, there has been known the connector described in Japanese Unexamined Patent Application Publication No. 2018-198216, for example. The connector described in Japanese Unexamined Patent Application Publication No. 2018-198216 includes multiple first terminals arranged in a first row extending in a left-right direction and multiple second terminals arranged in a second row extending in the left-right direction. The multiple first terminals include a left-end first terminal positioned at the left-end of the multiple first terminals, and a right-end first terminal positioned at the right-end of the multiple first terminals. The left-end first terminal and the right-end first terminal are larger than the first terminal (intermediate first terminal) other than the left-end first terminal and the right-end first terminal. The multiple second terminals include a left-end second terminal positioned at the left-end of the multiple second terminals, and a right-end second terminal positioned at the right-end of the multiple second terminals. The left-end second terminal and the right-end second terminal are larger than the second terminal (intermediate second terminal) other than the left-end second terminal and the right-end second terminal.

SUMMARY

There is a demand for increasing a degree of freedom in terminal layout. Specifically, in the connector described in Japanese Unexamined Patent Application Publication No. 2018-198216, an intermediate first terminal being a small terminal and an intermediate second terminal being a small terminal are arranged in a front-back direction. There is a case that an arrangement of the connector terminals described in Japanese Unexamined Patent Application Publication No. 2018-198216 above needs to be changed as follows, for example. Large terminals such as the left-end first terminal and the right-end first terminal, and small terminals such as the intermediate first terminal and the intermediate second terminal are arranged in the front-back direction.

Further, in a connector including terminals having multiple sizes, there is a demand for suppressing an increase in size of the connector while maintaining a distance between the terminals at a desired distance.

Accordingly, the present disclosure provides a connector capable of increasing the degree of freedom in layout of multiple terminals and suppressing an increase in size of the connector.

A connector according to a first aspect includes multiple terminals, and an insulation member holding the multiple terminals. The multiple terminals include a first terminal and a second terminal disposed in a first row extending in a left-right direction. The multiple terminals include a third terminal and a fourth terminal disposed in a second row extending in the left-right direction. The first row is positioned in front or back of the second row. The second terminal is disposed to right of the first terminal and is adjacent to the first terminal. The third terminal is disposed to right of the fourth terminal and is adjacent to the fourth terminal. The first terminal overlaps with the fourth terminal when viewed in a front-back direction. The second terminal overlaps with the third terminal when viewed in the front-back direction. A first width of the first terminal in the left-right direction is larger than a second width of the second terminal in the left-right direction. A third width of the third terminal in the left-right direction is larger than a fourth width of the fourth terminal in the left-right direction. A half of a value obtained by subtracting the fourth width from the first width is defined as a first distance. A half of a value obtained by subtracting the second width from the third width is defined as a second distance. The first terminal, the second terminal, the third terminal, and the fourth terminal are disposed to satisfy conditions (A) and (B): (A) (a1) a left-end of the first terminal is positioned to left of a left-end of the fourth terminal, and a distance between the left-end of the first terminal and the left-end of the fourth terminal in the left-right direction is shorter than the first distance, or (a2) the left-end of the first terminal coincides with the left-end of the fourth terminal in the left-right direction, and (B) (b1) a right-end of the second terminal is positioned to left of a right-end of the third terminal, and a distance between the right-end of the second terminal and the right-end of the third terminal in the left-right direction is shorter than the second distance, or (b2) the right-end of the second terminal coincides with the right-end of the third terminal in the left-right direction.

A connector according to a second aspect includes multiple terminals, and an insulation member holding the multiple terminals. The multiple terminals include a first terminal and a second terminal disposed in a first row extending in a left-right direction. The multiple terminals include a third terminal and a fourth terminal disposed in a second row extending in the left-right direction. The first row is positioned in front or back of the second row. The second terminal is disposed to right of the first terminal and is adjacent to the first terminal. The third terminal is disposed to right of the fourth terminal and is adjacent to the fourth terminal. The first terminal overlaps with the fourth terminal when viewed in a front-back direction. The second terminal overlaps with the third terminal when viewed in the front-back direction. A first width of the first terminal in the left-right direction is larger than a second width of the second terminal in the left-right direction. A third width of the third terminal in the left-right direction is larger than a fourth width of the fourth terminal in the left-right direction. A half of a value obtained by subtracting the fourth width from the first width is defined as a first distance. A half of a value obtained by subtracting the second width from the third width is defined as a second distance. The first terminal, the second terminal, the third terminal, and the fourth terminal are disposed to satisfy conditions (C) and (D): (C) (c1) a left-end of the fourth terminal is positioned to left of a left-end of the first terminal, and a distance between the left-end of the first terminal and the left-end of the fourth terminal in the left-right direction is shorter than the second distance, or (c2) the left-end of the first terminal coincides with the left-end of the fourth terminal in the left-right direction, and (D) (d1) a right-end of the third terminal is positioned to left of a right-end of the second terminal, and a distance between the right-end of the second terminal and the right-end of the third terminal in the left-right direction is shorter than the first distance, or (d2) the right-end of the second terminal coincides with the right-end of the third terminal in the left-right direction.

A connector according to a third aspect includes multiple terminals, and an insulation member holding the multiple terminals. The multiple terminals include a first terminal, a second terminal, and multiple fifth terminals disposed in a first row extending in a left-right direction. The multiple terminals include a third terminal, a fourth terminal, and multiple sixth terminals disposed in a second row extending in the left-right direction. The first row is positioned in front or back of the second row. The second terminal is disposed to right of the first terminal. The multiple fifth terminals are disposed to right of the first terminal and to left of the second terminal. The third terminal is disposed to right of the fourth terminal. The multiple sixth terminals are disposed to right of the fourth terminal and to left of the third terminal, The first terminal overlaps with the fourth terminal when viewed in a front-back direction. The second terminal overlaps with the third terminal when viewed in the front-back direction. A first width of the first terminal in the left-right direction is larger than a second width of the second terminal in the left-right direction. A third width of the third terminal in the left-right direction is larger than a fourth width of the fourth terminal in the left-right direction. Fifth widths of the multiple fifth terminals in the left-right direction are uniform. Sixth widths of the multiple sixth terminals in the left-right direction are uniform. A half of a value obtained by subtracting the fourth width from the first width is defined as a first distance. A half of a value obtained by subtracting the second width from the third width is defined as a second distance. The first terminal, the second terminal, the third terminal, and the fourth terminal are disposed to satisfy conditions (A) and (B): (A) (a1) a left-end of the first terminal is positioned to left of a left-end of the fourth terminal, and a distance between the left-end of the first terminal and the left-end of the fourth terminal in the left-right direction is shorter than the first distance, or (a2) the left-end of the first terminal coincides with the left-end of the fourth terminal in the left-right direction, and (B) (b1) a right-end of the second terminal is positioned to left of a right-end of the third terminal, and a distance between the right-end of the second terminal and the right-end of the third terminal in the left-right direction is shorter than the second distance, or (b2) the right-end of the second terminal coincides with the right-end of the third terminal in the left-right direction.

A connector according to a fourth aspect includes multiple terminals, and an insulation member holding the multiple terminals. The multiple terminals include a first terminal, a second terminal, and multiple fifth terminals disposed in a first row extending in a left-right direction. The multiple terminals include a third terminal, a fourth terminal, and multiple sixth terminals disposed in a second row extending in the left-right direction. The first row is positioned in front or back of the second row. The second terminal is disposed to right of the first terminal. The multiple fifth terminals are disposed to right of the first terminal and to left of the second terminal. The third terminal is disposed to right of the fourth terminal. The multiple sixth terminals are disposed to right of the fourth terminal and to left of the third terminal. The first terminal overlaps with the fourth terminal when viewed in a front-back direction. The second terminal overlaps with the third terminal when viewed in the front-back direction. A first width of the first terminal in the left-right direction is larger than a second width of the second terminal in the left-right direction. A third width of the third terminal in the left-right direction is larger than a fourth width of the fourth terminal in the left-right direction. Fifth widths of the multiple fifth terminals in the left-right direction are uniform. Sixth widths of the multiple sixth terminals in the left-right direction are uniform. A half of a value obtained by subtracting the fourth width from the first width is defined as a first distance. A half of a value obtained by subtracting the second width from the third width is defined as a second distance. The first terminal, the second terminal, the third terminal, and the fourth terminal are disposed to satisfy conditions (C) and (D): (C) (c1) a left-end of the fourth terminal is positioned to left of a left-end of the first terminal, and a distance between the left-end of the first terminal and the left-end of the fourth terminal in the left-right direction is shorter than the second distance, or (c2) the left-end of the first terminal coincides with the left-end of the fourth terminal in the left-right direction, and (D) (d1) a right-end of the third terminal is positioned to left of a right-end of the second terminal, and a distance between the right-end of the second terminal and the right-end of the third terminal in the left-right direction is shorter than the first distance, or (d2) the right-end of the second terminal coincides with the right-end of the third terminal in the left-right direction.

According to the present disclosure, it is possible to increase the degree of freedom in layout of multiple terminals and to suppress an increase in size of a connector.

DETAILED DESCRIPTION

Embodiment

[First Connector]

Figure 1:
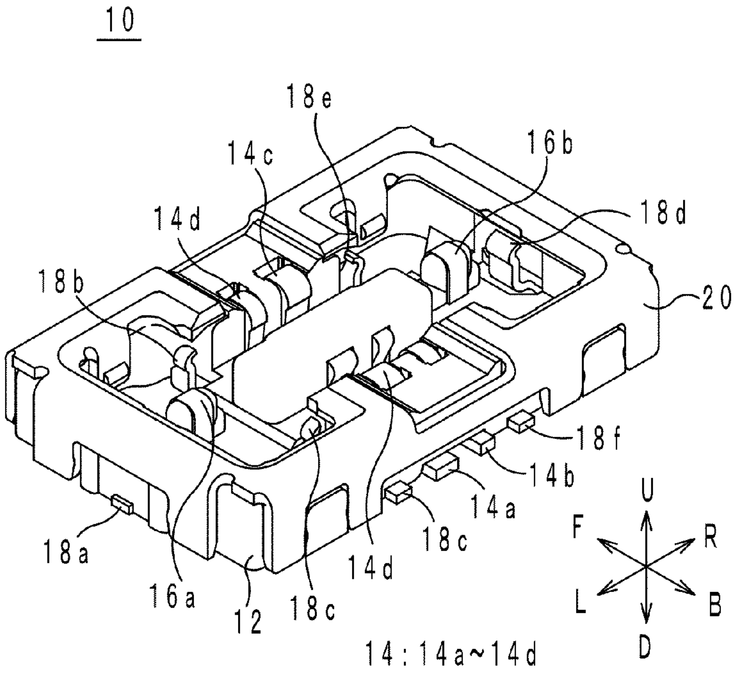
FIG. 1 is an external perspective view of a first connector.
Figure 2:
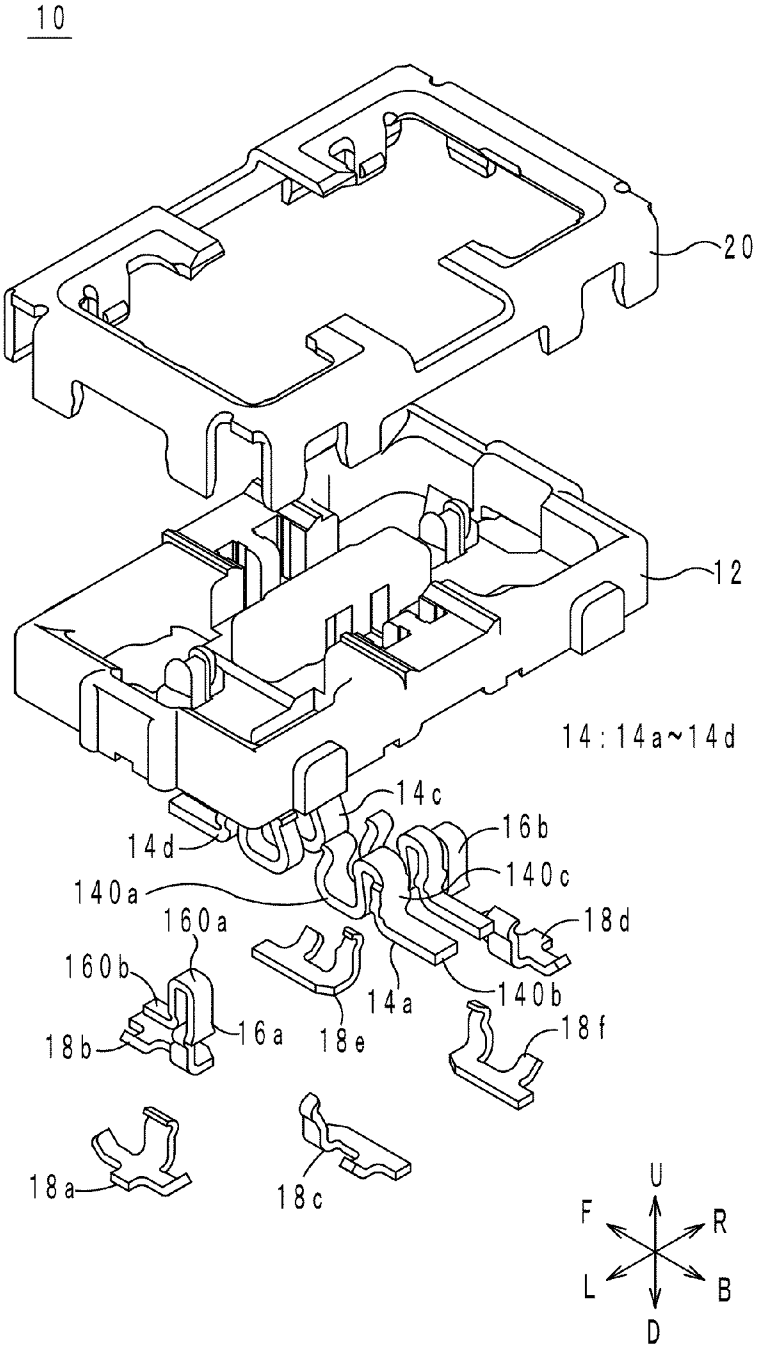
FIG. 2 is an exploded perspective view of the first connector.
Figure 3:
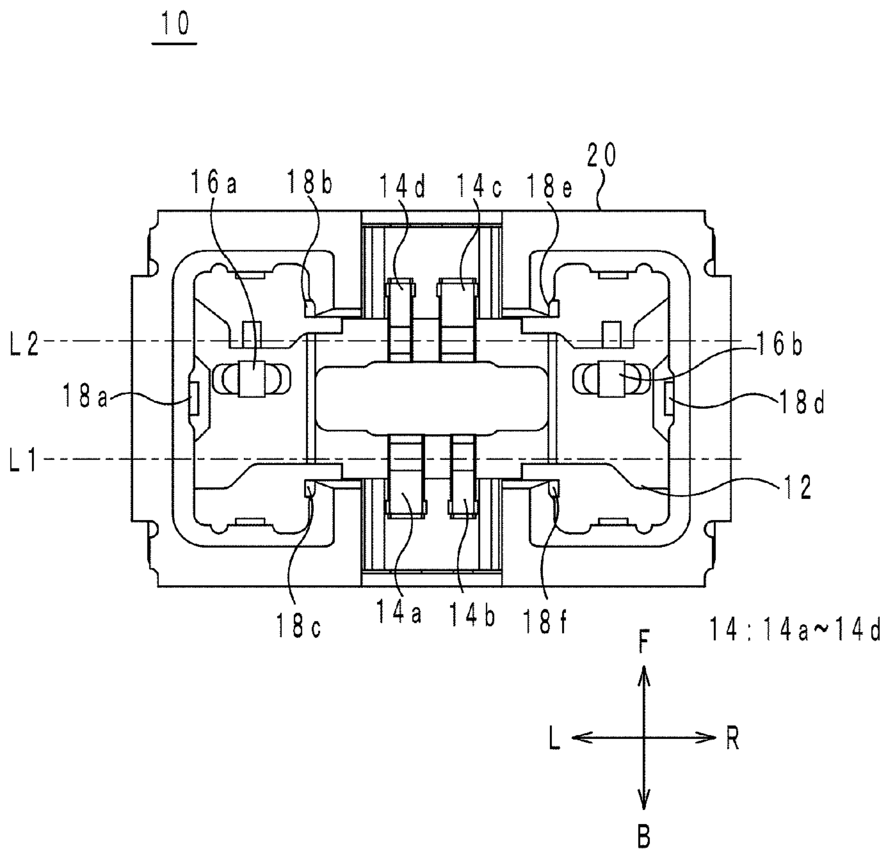
FIG. 3 is a top view of the first connector.

Hereinafter, a first connector according to an embodiment of the present disclosure will be described with reference to the drawings. FIG. 1 is an external perspective view of a first connector 10. FIG. 2 is an exploded perspective view of the first connector 10. FIG. 3 is a top view of the first connector 10.

As illustrated in FIG. 1 to FIG. 3, an up-down direction, a left-right direction, and a front-back direction are defined. Note that the up-down direction, the left-right direction, and the front-back direction are defined for the sake of explanation. Accordingly, the up-down direction, the left-right direction, and the front-back direction when the first connector 10 is actually used do not need to coincide with the up-down direction, the left-right direction, and the front-back direction in FIG. 1 to FIG. 3.

In this description, an axis or a member extending in the front-back direction does not necessarily indicate only an axis or a member parallel to the front-back direction. The axis or the member extending in the front-back direction refers to an axis or a member inclined within a range of ±45° relative to the front-back direction. Similarly, an axis or a member extending in the up-down direction refers to an axis or a member inclined within a range of ±45° relative to the up-down direction. An axis or a member extending in the left-right direction refers to an axis or a member inclined within a range of ±45° relative to the left-right direction.

In the present description, a first member and a second member arranged in the front-back direction refer to the following state. When the first member and the second member are viewed in a direction perpendicular to the front-back direction, the first member and the second member both are in a state being disposed on any straight line indicating the front-back direction. In the present description, the first member and the second member arranged in the front-back direction when viewed in the up-down direction refer to the following state. When the first member and the second member are viewed in the up-down direction, the first member and the second member both are disposed on any straight line indicating the front-back direction. In the case above, it is allowed that any one of the first member and the second member is not disposed on said any straight line indicating the front-back direction when the first member and the second member are viewed from the left-right direction different from the up-down direction. Note that, the first member and the second member may be in contact with each other. The first member and the second member may be separated from each other. A third member may be present between the first member and the second member. The definition above is also applied to the directions other than the front-back direction. Note that the first member to the third member are portions of a connector.

In the present description, the first member being disposed in front of the second member refers to the following state. At least the first member is partially disposed within a region through which the second member passes when moving in parallel to a forward direction. With this, the first member may fit within the region through which the second member passes when moving in parallel to the forward direction, or may protrude from the region through which the second member passes when moving in parallel to the forward direction. In the case above, the first member and the second member are arranged in the front-back direction. The definition above is also applied to the directions other than the front-back direction.

In the present description, the first member being disposed in front of the second member as viewed in the left-right direction refers to the following state. The first member and the second member are arranged in the front-back direction as viewed in the left-right direction, and a portion of the first member facing the second member is disposed in front of the second member as viewed in the left-right direction. In the definition above, it is allowed that the first member and the second member are not arranged in the front-back direction in a three-dimensional view. The definition above is also applied to the directions other than the front-back direction.

In the present description, the first member being disposed in front of the second member refers to the following state. The first member is disposed in front of a plane passing through a front-end of the second member and orthogonal to the front-back direction. In the case above, it is allowed that the first member and the second member are arranged side by side in the front-back direction, or the first member and the second member are not arranged side by side in the front-back direction. The definition above is also applied to the directions other than the front-back direction.

In the present description, unless otherwise specified, each portion of the first member is defined as follows. A front portion of the first member means a front half of the first member. A back portion of the first member means a back half of the first member. A left portion of the first member means a left half of the first member. A right portion of the first member means a right half of the first member. An upward portion of the first member means an upper half of the first member. A downward portion of the first member means a lower half of the first member. The front-end of the first member means an end in the forward direction of the first member. A back-end of the first member means an end in a backward direction of the first member. A left-end of the first member means an end in a leftward direction of the first member. A right-end of the first member means an end in a rightward direction of the first member. An upward-end of the first member means an end in an upward direction of the first member. A downward-end of the first member means an end in a downward direction of the first member. A front-end portion of the first member means the front-end of the first member and the vicinity thereof. A back-end portion of the first member means the back-end of the first member and the vicinity thereof. A left-end portion of the first member means the left-end of the first member and the vicinity thereof. A right-end portion of the first member means the right-end of the first member and the vicinity thereof. An upward-end portion of the first member means the upward-end of the first member and the vicinity thereof. A downward-end portion of the first member means the downward-end of the first member and the vicinity thereof.

The first connector 10 is coupled to a second connector 110 which will be described later. The first connector 10 is mounted on a circuit substrate such as a flexible substrate, for example. The first connector 10 includes an insulation member 12, multiple terminals 14 (multiple terminals), radio frequency terminals 16*a* and 16*b*, contact terminals 18*a* to 18*f*, and an external terminal 20.

The insulation member 12 is a block having a rectangular shape when viewed in the downward direction. The insulation member 12 is made of an insulation resin such as a liquid crystal polymer, for example. The insulation member 12 holds the multiple terminals 14, the radio frequency terminals 16*a* and 16*b*, the contact terminals 18*a* to 18*f*, and the external terminal 20. Specifically, the insulation member 12 is integrated with the multiple terminals 14, the radio frequency terminals 16*a* and 16*b*, the contact terminals 18*a* to 18*f*, and the external terminal 20 with insert molding, for example. Therefore, the multiple terminals 14, the radio frequency terminals 16*a* and 16*b*, the contact terminals 18*a* to 18*f*, and the external terminal 20 are partially embedded in the insulation member 12.

The external terminal 20 is a conductor connected to ground potential. The external terminal 20 has a rectangular annular shape when viewed in the downward direction. A long side of the external terminal 20 extends in the left-right direction. A short side of the external terminal 20 extends in the front-back direction. The external terminal 20 is manufactured by bending a single metal plate. The external terminal 20 is made of a copper-based material such as phosphor bronze, for example.

The external terminal 20 has a rectangular annular shape when viewed in the downward direction, thereby covering an upper surface of the insulation member 12 in the vicinity of a front side, the vicinity of a back side, the vicinity of a left side, and the vicinity of a right side. Note that, since the external terminal 20 has a rectangular annular shape when viewed in the downward direction, the central portion of the insulation member 12 is exposed through the external terminal 20 when viewed in the downward direction. The external terminal 20 covers the insulation member 12 on a part of a front surface, a part of a back surface, a part of a left surface, and a part of a right surface.

The multiple terminals 14 includes a first terminal 14*a*, a second terminal 14*b*, a third terminal 14*c*, and a fourth terminal 14*d*. The first terminal 14*a*, the second terminal 14*b*, the third terminal 14*c*, and the fourth terminal 14*d* are disposed closer to the vicinity of the center of the insulation member 12 than to an outer edge of the insulation member 12 when viewed in the downward direction.

The first terminal 14*a* and the second terminal 14*b* are disposed in a first row L1 extending in the left-right direction. That is, the first terminal 14*a* and the second terminal 14*b* are arranged in the left-right direction. The second terminal 14*b* is disposed to the right of the first terminal 14*a*. Further, the second terminal 14*b* is adjacent to the first terminal 14*a*. Therefore, no other terminal is disposed between the first terminal 14*a* and the second terminal 14*b*.

The third terminal 14*c* and the fourth terminal 14*d* are disposed in a second row L2 extending in the left-right direction. That is, the third terminal 14*c* and the fourth terminal 14*d* are arranged in the left-right direction. The third terminal 14*c* is disposed to the right of the fourth terminal 14*d*. Further, the third terminal 14*c* is adjacent to the fourth terminal 14*d*. Therefore, no other terminal is disposed between the fourth terminal 14*d* and the third terminal 14*c*. The first row L1 is positioned in the back of the second row L2.

The first terminal 14*a* overlaps with the fourth terminal 14*d* when viewed in the front-back direction. In the present embodiment, the first terminal 14*a* is disposed in the back of the fourth terminal 14*d*. The fourth terminal 14*d* does not protrude in the left-right direction from the first terminal 14*a* when viewed in the front-back direction.

The second terminal 14*b* overlaps with the third terminal 14*c* when viewed in the front-back direction. In the present embodiment, the second terminal 14*b* is disposed in the back of the third terminal 14*c*. The second terminal 14*b* does not protrude in the left-right direction from the third terminal 14*c* when viewed in the front-back direction.

A first width W1 of the first terminal 14*a* in the left-right direction is larger than a second width W2 of the second terminal 14*b* in the left-right direction. Accordingly, a conductor loss of the first terminal 14*a* is smaller than a conductor loss of the second terminal 14*b*. Further, a third width W3 of the third terminal 14*c* in the left-right direction is larger than a fourth width W4 of the fourth terminal 14*d* in the left-right direction. Accordingly, a conductor loss of the third terminal 14*c* is smaller than a conductor loss of the fourth terminal 14*d*. In the present embodiment, the first width W1 and the third width W3 are equal to each other. The second width W2 and the fourth width W4 are equal to each other. Further, the first width W1 and the fourth width W4 are not equal to each other. The second width W2 and the third width W3 are not equal to each other. The first width W1 is the maximum value of the width of the first terminal 14*a* in the left-right direction. The second width W2 is the maximum value of the width of the second terminal 14*b* in the left-right direction. The third width W3 is the maximum value of the width of the third terminal 14*c* in the left-right direction. The fourth width W4 is the maximum value of the width of the fourth terminal 14*d* in the left-right direction. Further, a distance between the right-end of the first terminal 14*a* and the left-end of the second terminal 14*b* is equal to a distance between the left-end of the third terminal 14*c* and the right-end of the fourth terminal 14*d*.

The first terminal 14*a* and the third terminal 14*c* are power supply terminals. Accordingly, the first terminal 14*a* and the third terminal 14*c* are terminals to be connected to power supply potential. The second terminal 14*b* and the fourth terminal 14*d* are digital signal terminals. Accordingly, the second terminal 14*b* and the fourth terminal 14*d* are terminals to which digital signals (that is, radio frequency signals) are applied. The first terminal 14*a*, the second terminal 14*b*, the third terminal 14*c*, and the fourth terminal 14*d* have the same structure except having different widths in the left-right direction. Hereinafter, the structures of the first terminal 14*a*, the second terminal 14*b*, the third terminal 14*c*, and the fourth terminal 14*d* will be described by taking the first terminal 14*a* as an example.

The first terminal 14*a* includes a U-shaped portion 140*a*, a lead-out portion 140*b*, and a connection portion 140*c*. The U-shaped portion 140*a* has a U-shape when viewed in the left-right direction. Accordingly, the U-shaped portion 140*a* has a shape recessed in the downward direction. An inner surface of the U-shaped portion 140*a* is exposed through the insulation member 12 when viewed in the downward direction. The lead-out portion 140*b* is positioned in the back of the bottom portion of the U-shaped portion 140*a*. The lead-out portion 140*b* extends linearly in the front-back direction. A back-end portion of the lead-out portion 140*b* is exposed through the insulation member 12. The connection portion 140*c* connects the back-end of the U-shaped portion 140*a* and the front-end of the lead-out portion 140*b*. The first terminal 14*a* described above is manufactured by bending a single metal plate. The first terminal 14*a* is made of a copper-based material such as phosphor bronze, for example.

The radio frequency terminal 16*a* is disposed on the left portion of the insulation member 12 when viewed in the downward direction. The radio frequency terminal 16*b* is disposed on the right portion of the insulation member 12 when viewed in the downward direction. The radio frequency terminals 16*a* and 16*b* are terminals to which radio frequency signals are applied. The radio frequency terminals 16*a* and 16*b* have the same structure. Hereinafter, the structure of the radio frequency terminals 16*a* and 16*b* will be described by taking the radio frequency terminal 16*a* as an example.

The radio frequency terminal 16*a* includes an inverted U-shaped portion 160*a* and a lead-out portion 160*b*. The inverted U-shaped portion 160*a* has an upside-down U-shape when viewed in the left-right direction. Accordingly, the inverted U-shaped portion 160*a* has a shape protruding in the upward direction. An outer surface of the inverted U-shaped portion 160*a* is exposed through the insulation member 12 when viewed in the downward direction. The lead-out portion 160*b* linearly extends in the forward direction from the front-end of the inverted U-shaped portion 160*a*. The front-end portion of the lead-out portion 160*b* is exposed through the insulation member 12. The radio frequency terminal 16*a* described above is manufactured by bending a single metal plate. The radio frequency terminal 16*a* is made of a copper-based material such as phosphor bronze, for example.

The contact terminals 18*a* to 18*c* are disposed on the left portion of the insulation member 12 when viewed in the downward direction. The contact terminal 18*a* is disposed on the left of the radio frequency terminal 16*a*. The contact terminal 18*b* is disposed on the front right of the radio frequency terminal 16*a*. The contact terminal 18*c* is disposed on the back right of the radio frequency terminal 16*a*. The contact terminals 18*d* to 18*f* are disposed on the right portion of the insulation member 12 when viewed in the downward direction. The contact terminal 18*d* is disposed on the right of the radio frequency terminal 16*b*. The contact terminal 18*e* is disposed on the front left of the radio frequency terminal 16*b*. The contact terminal 18*f* is disposed on the back left of the radio frequency terminal 16*b*. The contact terminals 18*a* and 18*b* are terminals connected to ground potential. The contact terminals 18*a* and 18*b* are manufactured by bending a single metal plate. The contact terminals 18*a* and 18*b* are made of a copper-based material such as phosphor bronze, for example.

The first connector 10 configured as described above is mounted on a circuit substrate. Specifically, the multiple terminals 14, the radio frequency terminals 16*a* and 16*b*, the contact terminals 18*a* to 18*f*, and the external terminal 20 are connected to land electrodes provided on the circuit substrate by soldering.

Figure 4:
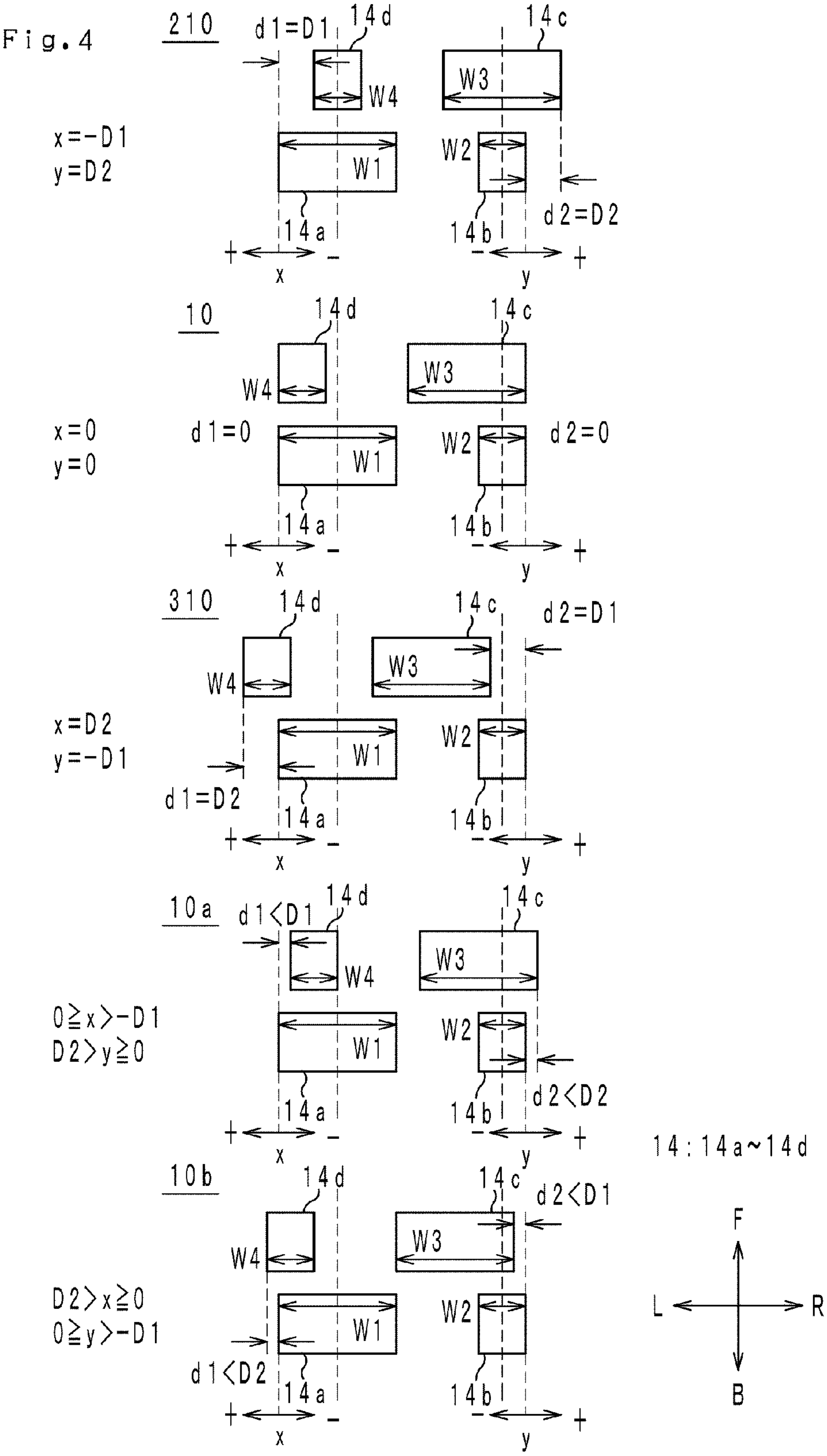
FIG. 4 is a top view of multiple terminals of the connectors according to a comparative example, and a top view of the multiple terminals of the first connectors.

Next, the disposition of the multiple terminals 14 will be described in detail with reference to the drawings. FIG. 4 is a top view of the multiple terminals 14 of connectors 210 and 310 according to a comparative example, and a top view of the multiple terminals 14 of the first connector 10, 10*a*, and 10*b*. The first connectors 10*a* and 10*b* are modifications of the first connector 10. FIG. 4 is schematically illustrated. Therefore, the sizes of the multiple terminals 14 in FIG. 4 do not match the sizes of the multiple terminals 14 in FIG. 1 to FIG. 3. Further, the connectors 210 and 310 are not included in the connector according to the present disclosure.

First, as illustrated in FIG. 4, a half of a value obtained by subtracting the fourth width W4 from the first width W1 is defined as a first distance D1. A half of a value obtained by subtracting the second width W2 from the third width W3 is defined as a second distance D2. Meanwhile, the first terminal 14*a*, the second terminal 14*b*, the third terminal 14*c*, and the fourth terminal 14*d* are disposed to satisfy conditions (A) and (B), or to satisfy conditions (C) and (D).

(A) (a1) The left-end of the first terminal 14*a* is positioned to the left of the left-end of the fourth terminal 14*d*, and a distance d1 between the left-end of the first terminal 14*a* and the left-end of the fourth terminal 14*d* in the left-right direction is shorter than the first distance D1, or (a2) the left-end of the first terminal 14*a* coincides with the left-end of the fourth terminal 14*d* in the left-right direction.

(B) (b1) The right-end of the second terminal 14*b* is positioned to the left of the right-end of the third terminal 14*c*, and a distance d2 between the right-end of the second terminal 14*b* and the right-end of the third terminal 14*c* in the left-right direction is shorter than the second distance D2, or (b2) the right-end of the second terminal 14*b* coincides with the right-end of the third terminal 14*c* in the left-right direction.

(C) (c1) The left-end of the fourth terminal 14*d* is positioned to the left of the left-end of the first terminal 14*a*, and the distance d1 between the left-end of the first terminal 14*a* and the left-end of the fourth terminal 14*d* in the left-right direction is shorter than the second distance D2, or (c2) the left-end of the first terminal 14*a* coincides with the left-end of the fourth terminal 14*d* in the left-right direction.

(D) (d1) The right-end of the third terminal 14*c* is positioned to the left of the right-end of the second terminal 14*b*, and the distance d2 between the right-end of the second terminal 14*b* and the right-end of the third terminal 14*c* in the left-right direction is shorter than the first distance D1, or (d2) the right-end of the second terminal 14*b* coincides with the right-end of the third terminal 14*c* in the left-right direction.

In the first connector 10, the first terminal 14*a*, the second terminal 14*b*, the third terminal 14*c*, and the fourth terminal 14*d* are disposed to satisfy the conditions (A) and (B). The left-end of the fourth terminal 14*d* is disposed closer to the left-end of the first terminal 14*a* than to the center of the first terminal 14*a* in the left-right direction. The right-end of the second terminal 14*b* is disposed closer to the right-end of the third terminal 14*c* than to the center of the third terminal 14*c* in the left-right direction. In particular, in the first connector 10, the first terminal 14*a*, the second terminal 14*b*, the third terminal 14*c*, and the fourth terminal 14*d* are disposed to satisfy the conditions (a2) of (A) and (b2) of (B). Accordingly, (a2) the left-end of the first terminal 14*a* coincides with the left-end of the fourth terminal 14*d* in the left-right direction. (b2) The right-end of the second terminal 14*b* coincides with the right-end of the third terminal 14*c* in the left-right direction.

Incidentally, as illustrated in the first connector 10*a* in FIG. 4, the first terminal 14*a*, the second terminal 14*b*, the third terminal 14*c*, and the fourth terminal 14*d* may be disposed to satisfy the conditions of (a1) of (A) and (b1) of (B). That is, it is allowed that the left-end of the first terminal 14*a* is positioned to the slight left of the left-end of the fourth terminal 14*d*, and the right-end of the second terminal 14*b* is positioned to the slight left of the right-end of the third terminal 14*c*. Note that, it is not allowed that the distance d1 between the left-end of the first terminal 14*a* and the left-end of the fourth terminal 14*d* in the left-right direction is equal to the first distance D1 as in the connector 210. Further, it is not allowed that the distance d2 between the right-end of the second terminal 14*b* and the right-end of the third terminal 14*c* in the left-right direction is equal to the second distance D2.

Further, as illustrated in the first connector 10*b* in FIG. 4, the first terminal 14*a*, the second terminal 14*b*, the third terminal 14*c*, and the fourth terminal 14*d* may be disposed to satisfy the conditions of (c1) of (C) and (d1) of (D). That is, it is allowed that the left-end of the fourth terminal 14*d* is positioned to the slight left of the left-end of the first terminal 14*a*, and the right-end of the third terminal 14*c* is positioned to the slight left of the right-end of the second terminal 14*b*. Note that, it is not allowed that the distance d1 between the left-end of the first terminal 14*a* and the left-end of the fourth terminal 14*d* in the left-right direction is equal to the second distance D2 as in the connector 310. Further, it is not allowed that the distance d2 between the right-end of the second terminal 14*b* and the right-end of the third terminal 14*c* in the left-right direction is equal to the first distance D1.

[Second Connector]

Figure 5:
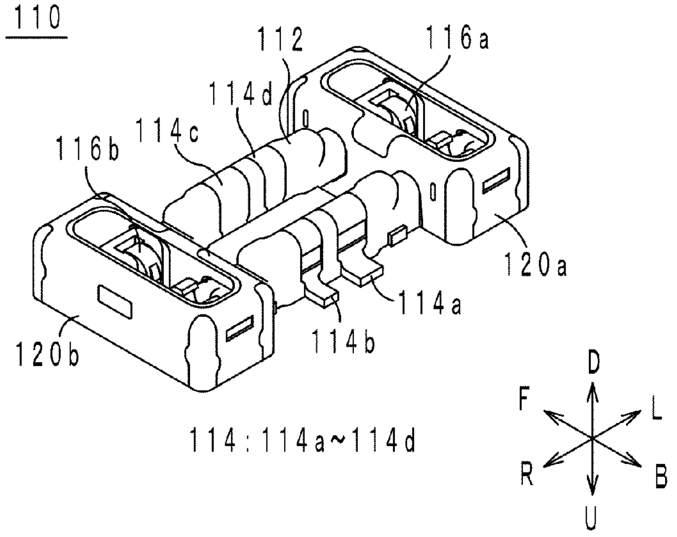
FIG. 5 is an external perspective view of a second connector.
Figure 6:
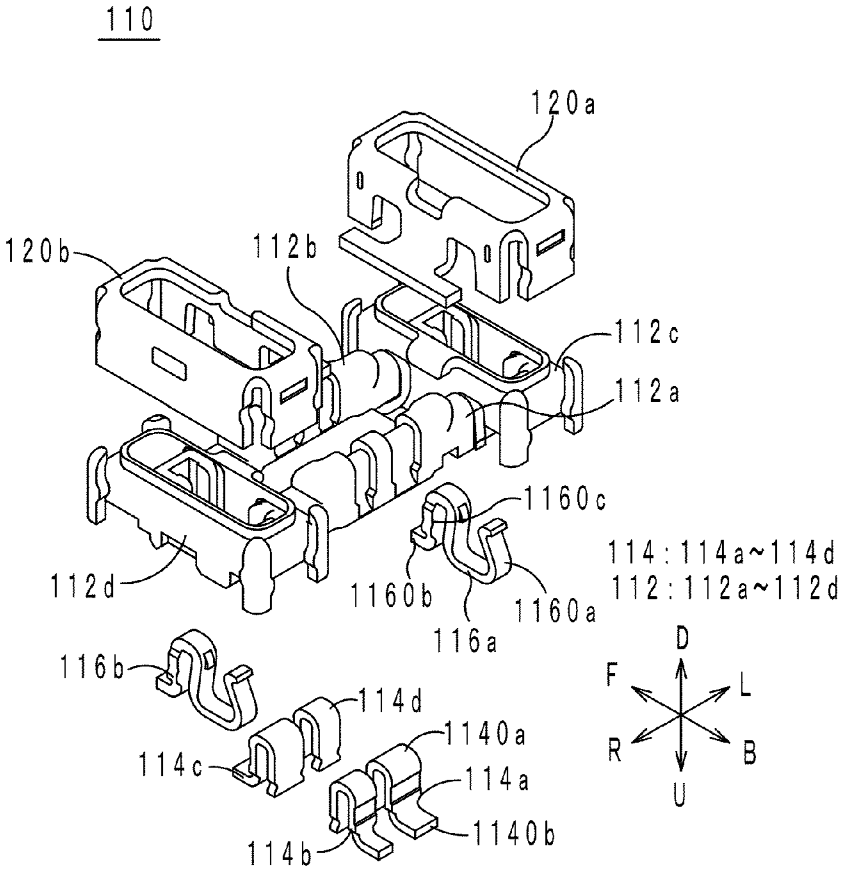
FIG. 6 is an exploded perspective view of the second connector.
Figure 7:
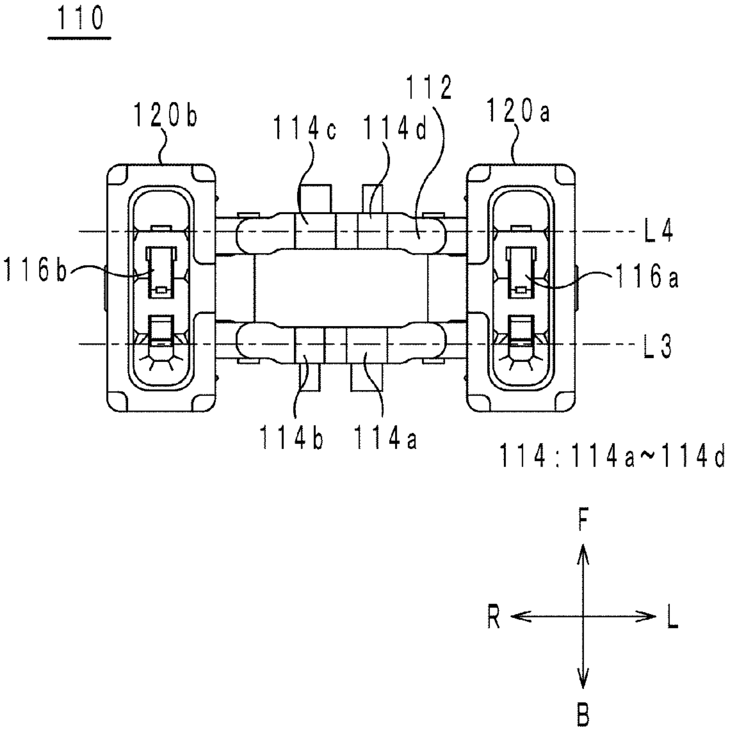
FIG. 7 is a bottom view of the second connector.

Hereinafter, a second connector according to an embodiment of the present disclosure will be described with reference to the drawings. FIG. 5 is an external perspective view of the second connector 110. FIG. 6 is an exploded perspective view of the second connector 110. FIG. 7 is a bottom view of the second connector 110.

As illustrated in FIG. 5 to FIG. 7, the up-down direction, the left-right direction, and the front-back direction are defined. Note that the up-down direction, the left-right direction, and the front-back direction are defined for the sake of explanation. Accordingly, the up-down direction, the left-right direction, and the front-back direction when the second connector 110 is actually used do not need to coincide with the up-down direction, the left-right direction, and the front-back direction in FIG. 5 to FIG. 7.

The second connector 110 is coupled to the first connector 10. The second connector 110 is mounted on a circuit substrate such as a flexible substrate, for example. The second connector 110 includes an insulation member 112, multiple terminals 114, radio frequency terminals 116*a* and 116*b*, and external terminals 120*a* and 120*b*.

The insulation member 112 includes a back connection portion 112*a*, a front connection portion 112*b*, a left portion 112*c*, and a right portion 112*d*. The left portion 112*c* and the right portion 112*d* have a rectangular shape when viewed in the upward direction. The right portion 112*d* is disposed to the right of the left portion 112*c*. The back connection portion 112*a* extends in the left-right direction. The back connection portion 112*a* connects the left portion 112*c* and the right portion 112*d*. The front connection portion 112*b* extends in the left-right direction. The front connection portion 112*b* connects the left portion 112*c* and the right portion 112*d*. The front connection portion 112*b* is disposed in front of the back connection portion 112*a*. The insulation member 112 is made of an insulation resin such as a liquid crystal polymer, for example. The insulation member 112 holds the multiple terminals 114, the radio frequency terminals 116*a* and 116*b*, and the external terminals 120*a* and 120*b*. Specifically, the insulation member 112 is integrated with the multiple terminals 114, the radio frequency terminals 116*a* and 116*b*, and the external terminals 120*a* and 120*b* with insert molding. Therefore, the multiple terminals 114, the radio frequency terminals 116*a* and 116*b*, and the external terminals 120*a* and 120*b* are partially embedded in the insulation member 112.

The external terminals 120*a* and 120*b* are conductors to be connected to ground potential. The external terminals 120*a* and 120*b* have a rectangular annular shape when viewed in the upward direction. Long sides of the external terminals 120*a* and 120*b* extend in the front-back direction. Short sides of the external terminals 120*a* and 120*b* extend in the left-right direction. Each of the external terminals 120*a* and 120*b* is manufactured by bending a single metal plate. The external terminals 120*a* and 120*b* are made of a copper-based material such as phosphor bronze, for example.

The external terminal 120*a* has a rectangular annular shape when viewed in the upward direction, thereby covering an upper surface of the left portion 112*c* of the insulation member 112 in the vicinity of a front side, the vicinity of a back side, the vicinity of a left side, and the vicinity of a right side. Note that, since the external terminal 120*a* has a rectangular annular shape when viewed in the upward direction, the central portion of the left portion 112*c* of the insulation member 112 is exposed through the external terminal 120*a* when viewed in the upward direction. The external terminal 120*a* covers the left portion 112*c* of the insulation member 112 on a part of a front surface, a part of a back surface, a part of a left surface, and a part of a right surface.

The external terminal 120*b* has a rectangular annular shape when viewed in the upward direction, thereby covering an upper surface of the right portion 112*d* of the insulation member 112 in the vicinity of a front side, the vicinity of a back side, the vicinity of a left side, and the vicinity of a right side. Note that, since the external terminal 120*b* has a rectangular annular shape when viewed in the upward direction, the central portion of the right portion 112*d* of the insulation member 112 is exposed through the external terminal 120*b* when viewed in the upward direction. The external terminal 120*b* covers the right portion 112*d* of the insulation member 112 on a part of a front surface, a part of a back surface, a part of a left surface, and a part of a right surface.

The multiple terminals 114 include a first terminal 114*a*, a second terminal 114*b*, a third terminal 114*c*, and a fourth terminal 114*d*. The first terminal 114*a*, the second terminal 114*b*, the third terminal 114*c*, and the fourth terminal 114*d* are disposed closer to the vicinity of the center of the insulation member 112 than to an outer edge of the insulation member 112 when viewed in the upward direction. In the present embodiment, the first terminal 114*a* and the second terminal 114*b* are held by the back connection portion 112*a*. The third terminal 114*c* and the fourth terminal 114*d* are held by the front connection portion 112*b*.

The first terminal 114*a* and the second terminal 114*b* are disposed in a first row L3 extending in the left-right direction. That is, the first terminal 114*a* and the second terminal 114*b* are arranged in the left-right direction. The second terminal 114*b* is disposed to the right of the first terminal 114*a*. Further, the second terminal 114*b* is adjacent to the first terminal 114*a*. Therefore, no other terminal is disposed between the first terminal 114*a* and the second terminal 114*b*.

The third terminal 114*c* and the fourth terminal 114*d* are disposed in a second row L4 extending in the left-right direction. That is, the third terminal 114*c* and the fourth terminal 114*d* are arranged in the left-right direction. The third terminal 114*c* is disposed to the right of the fourth terminal 114*d*. Further, the third terminal 114*c* is adjacent to the fourth terminal 114*d*. Therefore, no other terminal is disposed between the fourth terminal 114*d* and the third terminal 114*c*. The first row L3 is positioned in the back of the second row L4.

Further, the first terminal 114*a* overlaps with the fourth terminal 114*d* when viewed in the front-back direction. In the present embodiment, the first terminal 114*a* is disposed in the back of the fourth terminal 114*d*. The fourth terminal 114*d* does not protrude in the left-right direction from the first terminal 114*a* when viewed in the front-back direction.

The second terminal 114*b* overlaps with the third terminal 114*c* when viewed in the front-back direction. In the present embodiment, the second terminal 114*b* is disposed in the back of the third terminal 114*c*. The second terminal 114*b* does not protrude in the left-right direction from the third terminal 114*c* when viewed in the front-back direction.

The first width W1 of the first terminal 114*a* in the left-right direction is larger than the second width W2 of the second terminal 114*b* in the left-right direction. Accordingly, a conductor loss of the first terminal 114*a* is smaller than a conductor loss of the second terminal 114*b*. Further, the third width W3 of the third terminal 114*c* in the left-right direction is larger than the fourth width W4 of the fourth terminal 114*d* in the left-right direction. Accordingly, a conductor loss of the third terminal 114*c* is smaller than a conductor loss of the fourth terminal 114*d*. In the present embodiment, the first width W1 and the third width W3 are equal to each other. The second width W2 and the fourth width W4 are equal to each other. The first width W1 is the maximum value of the width of the first terminal 114*a* in the left-right direction. The second width W2 is the maximum value of the width of the second terminal 114*b* in the left-right direction. The third width W3 is the maximum value of the width of the third terminal 114*c* in the left-right direction. The fourth width W4 is the maximum value of the width of the fourth terminal 114*d* in the left-right direction. Further, a distance between the right-end of the first terminal 114*a* and the left-end of the second terminal 114*b* is equal to a distance between the left-end of the third terminal 114*c* and the right-end of the fourth terminal 114*d*.

The first terminal 114*a* and the third terminal 114*c* are the power supply terminals. Accordingly, the first terminal 114*a* and the third terminal 114*c* are terminals to be connected to power supply potential. The second terminal 114*b* and the fourth terminal 114*d* are the digital signal terminals. Accordingly, the second terminal 114*b* and the fourth terminal 114*d* are terminals to which digital signals (that is, radio frequency signals) are applied. The first terminal 114*a*, the second terminal 114*b*, the third terminal 114*c*, and the fourth terminal 114*d* have the same structure except having different widths in the left-right direction. Hereinafter, the structures of the first terminal 114*a*, the second terminal 114*b*, the third terminal 114*c*, and the fourth terminal 114*d* will be described by taking the first terminal 114*a* as an example.

The first terminal 114*a* includes a U-shaped portion 1140*a* and a lead-out portion 1140*b*. The U-shaped portion 1140*a* has a U-shape when viewed in the left-right direction. Accordingly, the U-shaped portion 1140*a* has a shape protruding in the downward direction. An outer surface of the U-shaped portion 1140*a* is exposed through the insulation member 112 when viewed in the upward direction. The lead-out portion 1140*b* linearly extends in the backward direction from the back-end of the U-shaped portion 1140*a*. The back-end portion of the lead-out portion 1140*b* is exposed on the insulation member 112. The first terminal 114*a* described above is manufactured by bending a single metal plate. The first terminal 114*a* is made of a copper-based material such as phosphor bronze, for example.

The radio frequency terminal 116*a* is disposed in the left portion 112*c* of the insulation member 112 when viewed in the upward direction. The radio frequency terminal 116*b* is disposed in the right portion 112*d* of the insulation member 112 when viewed in the upward direction. The radio frequency terminals 116*a* and 116*b* are terminals to which radio frequency signals are applied. The radio frequency terminals 116*a* and 116*b* have the same structure. Hereinafter, the structure of the radio frequency terminals 116*a* and 116*b* will be described by taking the radio frequency terminal 116*a* as an example.

The radio frequency terminal 116*a* includes an inverted U-shaped portion 1160*a*, a lead-out portion 1160*b*, and a connection portion 1160*c*. The inverted U-shaped portion 1160*a* has an upside-down U-shape when viewed in the left-right direction. Accordingly, the inverted U-shaped portion 1160*a* has a shape recessed in the upward direction. An inner surface of the inverted U-shaped portion 1160*a* is exposed through the insulation member 112 when viewed in the upward direction. The lead-out portion 1160*b* is positioned in front of the bottom portion of the inverted U-shaped portion 1160*a*. The lead-out portion 1160*b* extends linearly in the front-back direction. The front-end portion of the lead-out portion 1160*b* is exposed through the insulation member 112. The connection portion 1160*c* connects the front-end of the inverted U-shaped portion 1160*a* and the back-end of the lead-out portion 1160*b*. The radio frequency terminal 116*a*4*a* described above is manufactured by bending a single metal plate. The radio frequency terminal 116*aa* is made of a copper-based material such as phosphor bronze, for example.

The second connector 110 configured as described above is mounted on a circuit substrate. Specifically, the multiple terminals 114, the radio frequency terminals 116*a* and 116*b*, and the external terminals 120*a* and 120*b* are connected to land electrodes provided on the circuit substrate by soldering.

The detail of the disposition of the multiple terminals 114 as described above is the same as the detail of the disposition of the multiple terminals 14 in FIG. 4. Accordingly, a detailed description of the disposition of the multiple terminals 114 is omitted.

[Connection Between First Connector and Second Connector]

The first connector 10 and the second connector 110 configured as described above are coupled to each other. Specifically, the second connector 110 is disposed on the first connector 10. Then, the second connector 110 is moved in the downward direction. The external terminal 120*a* is inserted into the left portion of a region surrounded by the external terminal 20. At this time, the external terminal 20 and the contact terminals 18*a* to 18*c* come into contact with the external terminal 120*a*. Further, the external terminal 120*b* is inserted into the right portion of the region surrounded by the external terminal 20. At this time, the external terminal 20 and the contact terminals 18*d* to 18*f* are coupled to the external terminal 120*b*.

Further, the radio frequency terminals 16*a* and 16*b* are respectively coupled to the radio frequency terminals 116*a* and 116*b*. The first terminal 14*a*, the second terminal 14*b*, the third terminal 14*c*, and the fourth terminal 14*d* are respectively coupled to the first terminal 114*a*, the second terminal 114*b*, the third terminal 114*c*, and the fourth terminal 114*d*.

[Effect]

With the use of the first connector 10 and the second connector 110 configured as described above, it is possible to increase the degree of freedom in the layout of the multiple terminals 14. The description of the effect of the second connector 110 is the same as the description of the effect of the first connector 10. Hereinafter, the effect of the first connector 10 will be described.

In more detail, the first width W1 of the first terminal 14*a* in the left-right direction is larger than the second width W2 of the second terminal 14*b* in the left-right direction. The third width W3 of the third terminal 14*c* in the left-right direction is larger than the fourth width W4 of the fourth terminal 14*d* in the left-right direction. Further, the first terminal 14*a* overlaps with the fourth terminal 14*d* when viewed in the front-back direction. The second terminal 14*b* overlaps with the third terminal 14*c* when viewed in the front-back direction. Thus, the two terminals having different sizes are arranged in the front-back direction. Consequently, with the use of the first connector 10, it is possible to increase the degree of freedom in the layout of the multiple terminals 14.

Further, with the use of the first connector 10, it is possible to suppress an increase in the size of the first connector 10. In more detail, in a case that two terminals having different sizes are arranged in the front-back direction, a disposition in such as the connector 210 in FIG. 4 is adopted. Specifically, the center of the first terminal 14*a* in the left-right direction and the center of the fourth terminal 14*d* in the left-right direction coincide with each other. The center of the second terminal 14*b* in the left-right direction and the center of the third terminal 14*c* in the left-right direction coincide with each other. In the case above, a length of the multiple terminals 14 in the left-right direction is the sum of a distance from the right-end of the third terminal 14*c* to the left-end of the fourth terminal 14*d* and the first distance D1, or the sum of a distance from the left-end of the first terminal 14*a* to the right-end of the second terminal 14*b* and the second distance D2. Therefore, in the connector 210, the length of the multiple terminals 14 in the left-right direction is increased.

Hence, the first terminal 14*a*, the second terminal 14*b*, the third terminal 14*c*, and the fourth terminal 14*d* are disposed to satisfy the conditions (A) and (B), or to satisfy the conditions (C) and (D).

(A) (a1) The left-end of the first terminal 14*a* is positioned to the left of the left-end of the fourth terminal 14*d*, and the distance d1 between the left-end of the first terminal 14*a* and the left-end of the fourth terminal 14*d* in the left-right direction is shorter than the first distance D1, or (a2) the left-end of the first terminal 14*a* coincides with the left-end of the fourth terminal 14*d* in the left-right direction.

(B) (b1) The right-end of the second terminal 14*b* is positioned to the left of the right-end of the third terminal 14*c*, and the distance d2 between the right-end of the second terminal 14*b* and the right-end of the third terminal 14*c* in the left-right direction is shorter than the second distance D2, or (b2) the right-end of the second terminal 14*b* coincides with the right-end of the third terminal 14*c* in the left-right direction.

(C) (c1) The left-end of the fourth terminal 14*d* is positioned to the left of the left-end of the first terminal 14*a*, and the distance d1 between the left-end of the first terminal 14*a* and the left-end of the fourth terminal 14*d* in the left-right direction is shorter than the second distance D2, or (c2) the left-end of the first terminal 14*a* coincides with the left-end of the fourth terminal 14*d* in the left-right direction.

(D) (d1) The right-end of the third terminal 14*c* is positioned to the left of the right-end of the second terminal 14*b*, and the distance d2 between the right-end of the second terminal 14*b* and the right-end of the third terminal 14*c* in the left-right direction is shorter than the first distance D1, or (d2) the right-end of the second terminal 14*b* coincides with the right-end of the third terminal 14*c* in the left-right direction.

Hereinafter, the conditions to be satisfied in the disposition of the first terminal 14*a*, the second terminal 14*b*, the third terminal 14*c*, and the fourth terminal 14*d* will be described using expressions different from the expressions above. First, the position of the left-end of the fourth terminal 14*d* relative to the position of the left-end of the first terminal 14*a* is defined as x. At the position of the left-end of the first terminal 14*a, x* is defined as 0. When the left-end of the fourth terminal 14*d* is positioned to the left of the left-end of the first terminal 14*a, x* takes a positive value. When the left-end of the fourth terminal 14*d* is positioned to the right of the left-end of the first terminal 14*a, x* takes a negative value.

Next, the position of the right-end of the third terminal 14*c* relative to the position of the right-end of the second terminal 14*b* is defined as y. At the position of the right-end of the second terminal 14*b, y* is defined as 0. When the right-end of the third terminal 14*c* is positioned to the left of the right-end of the second terminal 14*b, y* takes a negative value. When the right-end of the third terminal 14*c* is positioned to the right of the right-end of the second terminal 14*b, y* takes a positive value.

Meanwhile, the first terminal 14*a*, the second terminal 14*b*, the third terminal 14*c*, and the fourth terminal 14*d* are disposed to satisfy inequality (1) and inequality (2), or to satisfy inequality (3) and inequality (4).

$$0 \geq x > -D1 \quad (1)$$

$$D2 > y \geq 0 \quad (2)$$

$$D2 > x \geq 0 \quad (3)$$

$$0 \geq y > -D1 \quad (4)$$

A case that the first terminal 14*a*, the second terminal 14*b*, the third terminal 14*c*, and the fourth terminal 14*d* are disposed to satisfy the conditions (A) and (B) will be described. In the case above, the length of the multiple terminals 14 in the left-right direction is the sum of the distance from the right-end of the third terminal 14*c* to the left-end of the fourth terminal 14*d*, and the distance d1. The distance d1 is shorter than the first distance D1. Therefore, the length of the multiple terminals 14 of the first connector 10 in the left-right direction is shorter than the length of the multiple terminals 14 of the connector 210 in the left-right direction. With this, an increase in the size of the first connector 10 is suppressed.

A case that the first terminal 14*a*, the second terminal 14*b*, the third terminal 14*c*, and the fourth terminal 14*d* are disposed to satisfy the conditions (C) and (D) will be described. In the case above, the length of the multiple terminals 14 in the left-right direction is the sum of the distance from the right-end of the third terminal 14*c* to the left-end of the fourth terminal 14*d*, and the distance d2. The distance d2 is shorter than the first distance D1. Therefore, the length of the multiple terminals 14 of the first connector 10 in the left-right direction is shorter than the length of the multiple terminals 14 of the connector 310 in the left-right direction. With this, an increase in the size of the first connector 10 is suppressed.

Further, with the use of the first connector 10, it is possible to further suppress an increase in the size of the first connector 10. In more detail, the left-end of the fourth terminal 14*d* is disposed closer to the left-end of the first terminal 14*a* than to the center of the first terminal 14*a* in the left-right direction. This shortens the distance d1. Further, the right-end of the second terminal 14*b* is disposed closer to the right-end of the third terminal 14*c* than to the center of the third terminal 14*c* in the left-right direction. This shortens the distance d2. Consequently, the length of the multiple terminals 14 of the first connector 10 in the left-right direction is shortened. With this, an increase in the size of the first connector 10 is further suppressed.

Further, with the use of the first connector 10, it is possible to further suppress an increase in the size of the first connector 10. In more detail, the left-end of the first terminal 14*a* coincides with the left-end of the fourth terminal 14*d* in the left-right direction. The right-end of the second terminal 14*b* coincides with the right-end of the third terminal 14*c* in the left-right direction. In the case above, the distances d1 and d2 are 0. Consequently, the length of the multiple terminals 14 of the first connector 10 in the left-right direction is the distance from the right-end of the third terminal 14*c* to the left-end of the fourth terminal 14*d*. With this, the length of the multiple terminals 14 of the first connector 10 in the left-right direction is minimized. As described above, with the use of the first connector 10, it is possible to further suppress an increase in the size of the first connector 10.

Other Embodiments

Note that, the structures of the first connectors 10, 10*a*, and 10*b* may be combined in any manner. Further, the structures of the first connectors 10, 10*a*, and 10*b* may be used for the second connector 110.

Note that, in the first connectors 10, 10*a*, and 10*b*, the first row L1 may be positioned in front of the second row L2. Further, in the second connector 110, the first row L3 may be positioned in front of the second row L4.

Note that, in the first connectors 10, 10*a*, and 10*b*, the multiple terminals 14 may include multiple sets of the first terminal 14*a*, the second terminal 14*b*, the third terminal 14*c*, and the fourth terminal 14*d*. Accordingly, multiple sets of the first terminal 14*a*, the second terminal 14*b*, the third terminal 14*c*, and the fourth terminal 14*d* may be arranged in the left-right direction.

Note that, in the second connector 110, the multiple terminals 114 may include multiple sets of the first terminal 114*a*, the second terminal 114*b*, the third terminal 114*c*, and the fourth terminal 114*d*. Accordingly, multiple sets of the first terminal 114*a*, the second terminal 114*b*, the third terminal 114*c*, and the fourth terminal 114*d* may be arranged in the left-right direction.

Note that, the first terminals 14*a* and 114*a*, and the third terminals 14*c* and 114*c* may be the digital signal terminals. Further, the second terminals 14*b* and 114*b*, and the fourth terminals 14*d* and 114*d* may be the power supply terminals.

Note that, it is allowed that the first width W1 of the first terminal 14*a* in the left-right direction and the third width W3 of the third terminal 14*c* in the left-right direction are not equal to each other. Similarly, it is allowed that the second width W2 of the second terminal 14*b* in the left-right direction and the fourth width W4 of the fourth terminal 14*d* in the left-right direction are not equal to each other. In the case above, the distance from the left-end of the first terminal 14*a* to the right-end of the second terminal 14*b* is preferably equal to the distance from the left-end of the fourth terminal 14*d* to the right-end of the third terminal 14*c*.

Further, it is allowed that the first width W1 of the first terminal 14*a* in the left-right direction and the third width W3 of the third terminal 14*c* in the left-right direction are not equal to each other, and the second width W2 of the second terminal 14*b* in the left-right direction and the fourth width W4 of the fourth terminal 14*d* in the left-right direction are equal to each other. Furthermore, it is allowed that the first width W1 of the first terminal 14*a* in the left-right direction and the third width W3 of the third terminal 14*c* in the left-right direction are equal to each other, and the second width W2 of the second terminal 14*b* in the left-right direction and the fourth width W4 of the fourth terminal 14*d* in the left-right direction are not equal to each other. In the above cases as well, the distance from the left-end of the first terminal 14*a* to the right-end of the second terminal 14*b* is preferably equal to the distance from the left-end of the fourth terminal 14*d* to the right-end of the third terminal 14*c*.

Note that, it is allowed that the first width W1 of the first terminal 114*a* in the left-right direction and the third width W3 of the third terminal 114*c* in the left-right direction are not equal to each other. Similarly, it is allowed that the second width W2 of the second terminal 114*b* in the left-right direction and the fourth width W4 of the fourth terminal 114*d* in the left-right direction are not equal to each other. In the case above, a distance from the left-end of the first terminal 114*a* to the right-end of the second terminal 114*b* is preferably equal to a distance from the left-end of the fourth terminal 114*d* to the right-end of the third terminal 114*c*.

Further, it is allowed that the first width W1 of the first terminal 114*a* in the left-right direction and the third width W3 of the third terminal 114*c* in the left-right direction are not equal to each other, and the second width W2 of the second terminal 114*b* in the left-right direction and the fourth width W4 of the fourth terminal 114*d* in the left-right direction are equal to each other. Furthermore, it is allowed that the first width W1 of the first terminal 114*a* in the left-right direction and the third width W3 of the third terminal 114*c* in the left-right direction are equal to each other, and the second width W2 of the second terminal 114*b* in the left-right direction and the fourth width W4 of the fourth terminal 114*d* in the left-right direction are not equal to each other. In the above cases as well, the distance from the left-end of the first terminal 114*a* to the right-end of the second terminal 114*b* is preferably equal to the distance from the left-end of the fourth terminal 114*d* to the right-end of the third terminal 114*c*.

Note that, it is allowed that the first terminal 14*a* and the second terminal 14*b* are not adjacent to each other. In the case above, the multiple terminals 14 may include multiple fifth terminals and multiple sixth terminals. The multiple fifth terminals are disposed in the first row L1 extending in the left-right direction. The multiple fifth terminals are disposed to the right of the first terminal 14*a* and to the left of the second terminal 14*b*. Fifth widths of the multiple fifth terminals in the left-right direction are uniform. The multiple sixth terminals are disposed in the second row L2 extending in the left-right direction. The multiple sixth terminals are disposed to the right of the fourth terminal 14*d* and to the left of the third terminal 14*c*. Sixth widths of the multiple sixth terminals in the left-right direction are uniform. As described above, the multiple fifth terminals may be provided between the first terminal 14*a* and the second terminal 14*b*. The multiple sixth terminals may be provided between the third terminal 14*c* and the fourth terminal 14*d*.

Note that, it is allowed that the first terminal 114*a* and the second terminal 114*b* are not adjacent to each other. In the case above, the multiple terminals 114 may include multiple fifth terminals and multiple sixth terminals. The multiple fifth terminals are disposed in the first row L3 extending in the left-right direction. The multiple fifth terminals are disposed to the right of the first terminal 114*a* and to the left of the second terminal 114*b*. The fifth widths of the multiple fifth terminals in the left-right direction are uniform. The multiple sixth terminals are disposed in the second row L4 extending in the left-right direction. The multiple sixth terminals are disposed to the right of the fourth terminal 114*d* and to the left of the third terminal 114*c*. The sixth widths of the multiple sixth terminals in the left-right direction are uniform. As described above, the multiple fifth terminals may be provided between the first terminal 114*a* and the second terminal 114*b*. The multiple sixth terminals may be provided between the third terminal 114*c* and the fourth terminal 114*d*.

Note that, the effect of suppressing an increase in the size of a connector is greater in the first connectors 10, 10*a*, 10*b*, and the second connector 110 that do not include the multiple fifth terminals and the multiple sixth terminals than in a connector that includes the multiple fifth terminals and the multiple sixth terminals.

What is claimed is:

1. A connector, comprising:

multiple terminals; and an insulation member holding the multiple terminals, wherein the multiple terminals include a first terminal and a second terminal disposed in a first row extending in a left-right direction, the multiple terminals include a third terminal and a fourth terminal disposed in a second row extending in the left-right direction, the first row is positioned in front or back of the second row, the second terminal is disposed to right of the first terminal and is adjacent to the first terminal, the third terminal is disposed to right of the fourth terminal and is adjacent to the fourth terminal, the first terminal overlaps with the fourth terminal when viewed in a front-back direction, the second terminal overlaps with the third terminal when viewed in the front-back direction, a first width of the first terminal in the left-right direction is larger than a second width of the second terminal in the left-right direction, a third width of the third terminal in the left-right direction is larger than a fourth width of the fourth terminal in the left-right direction, a half of a value obtained by subtracting the fourth width from the first width is defined as a first distance, a half of a value obtained by subtracting the second width from the third width is defined as a second distance, and the first terminal, the second terminal, the third terminal, and the fourth terminal are disposed to satisfy conditions (A) and (B):

(A) (a1) a left-end of the first terminal is positioned to left of a left-end of the fourth terminal, and a distance between the left-end of the first terminal and the left-end of the fourth terminal in the left-right direction is shorter than the first distance, or (a2) the left-end of the first terminal coincides with the left-end of the fourth terminal in the left-right direction, and (B) (b1) a right-end of the second terminal is positioned to left of a right-end of the third terminal, and a distance between the right-end of the second terminal and the right-end of the third terminal in the left-right direction is shorter than the second distance, or (b2) the right-end of the second terminal coincides with the right-end of the third terminal in the left-right direction.

2. A connector comprising:

multiple terminals; and an insulation member holding the multiple terminals, wherein the multiple terminals include a first terminal and a second terminal disposed in a first row extending in a left-right direction, the multiple terminals include a third terminal and a fourth terminal disposed in a second row extending in the left-right direction, the first row is positioned in front or back of the second row, the second terminal is disposed to right of the first terminal and is adjacent to the first terminal, the third terminal is disposed to right of the fourth terminal and is adjacent to the fourth terminal, the first terminal overlaps with the fourth terminal when viewed in a front-back direction, the second terminal overlaps with the third terminal when viewed in the front-back direction, a first width of the first terminal in the left-right direction is larger than a second width of the second terminal in the left-right direction, a third width of the third terminal in the left-right direction is larger than a fourth width of the fourth terminal in the left-right direction, a half of a value obtained by subtracting the fourth width from the first width is defined as a first distance, a half of a value obtained by subtracting the second width from the third width is defined as a second distance, and the first terminal, the second terminal, the third terminal, and the fourth terminal are disposed to satisfy conditions (C) and (D):

(C) (c1) a left-end of the fourth terminal is positioned to left of a left-end of the first terminal, and a distance between the left-end of the first terminal and the left-end of the fourth terminal in the left-right direction is shorter than the second distance, or (c2) the left-end of the first terminal coincides with the left-end of the fourth terminal in the left-right direction, and (D) (d1) a right-end of the third terminal is positioned to left of a right-end of the second terminal, and a distance between the right-end of the second terminal and the right-end of the third terminal in the left-right direction is shorter than the first distance, or (d2) the right-end of the second terminal coincides with the right-end of the third terminal in the left-right direction.

3. The connector according to claim 1, wherein the first terminal, the second terminal, the third terminal, and the fourth terminal are disposed to satisfy the conditions (A) and (B), the left-end of the fourth terminal is disposed closer to the left-end of the first terminal than to a center of the first terminal in the left-right direction, and the right-end of the second terminal is disposed closer to the right-end of the third terminal than to a center of the third terminal in the left-right direction.

4. The connector according to claim 1, wherein the first terminal, the second terminal, the third terminal, and the fourth terminal are disposed to satisfy the conditions (a2) of (A) and (b2) of (B).

5. The connector according to claim 1, wherein the first width and the third width are equal to each other, and the second width and the fourth width are equal to each other.

6. The connector according to claim 5, wherein a distance between a right-end of the first terminal and a left-end of the second terminal is equal to a distance between a left-end of the third terminal and a right-end of the fourth terminal.

7. The connector according to claim 1, wherein the first terminal and the third terminal are power supply terminals.

8. The connector according to claim 1, wherein the second terminal and the fourth terminal are digital signal terminals.

9. The connector according to claim 1, wherein the multiple terminals include multiple sets of the first terminal, the second terminal, the third terminal, and the fourth terminal.

10. The connector according to claim 2, wherein the first width and the third width are equal to each other, and the second width and the fourth width are equal to each other.

11. The connector according to claim 3, wherein the first width and the third width are equal to each other, and the second width and the fourth width are equal to each other.

12. The connector according to claim 4, wherein the first width and the third width are equal to each other, and the second width and the fourth width are equal to each other.

13. The connector according to claim 2, wherein the first terminal and the third terminal are power supply terminals.

14. The connector according to claim 3, wherein the first terminal and the third terminal are power supply terminals.

15. The connector according to claim 2, wherein the second terminal and the fourth terminal are digital signal terminals.

16. The connector according to claim 3, wherein the second terminal and the fourth terminal are digital signal terminals.

17. The connector according to claim 2, wherein the multiple terminals include multiple sets of the first terminal, the second terminal, the third terminal, and the fourth terminal.

18. The connector according to claim 3, wherein the multiple terminals include multiple sets of the first terminal, the second terminal, the third terminal, and the fourth terminal.

19. A connector, comprising:

multiple terminals; and an insulation member holding the multiple terminals, wherein the multiple terminals include a first terminal, a second terminal, and multiple fifth terminals disposed in a first row extending in a left-right direction, the multiple terminals include a third terminal, a fourth terminal, and multiple sixth terminals disposed in a second row extending in the left-right direction, the first row is positioned in front or back of the second row, the second terminal is disposed to right of the first terminal, the multiple fifth terminals are disposed to right of the first terminal and to left of the second terminal, the third terminal is disposed to right of the fourth terminal, the multiple sixth terminals are disposed to right of the fourth terminal and to left of the third terminal, the first terminal overlaps with the fourth terminal when viewed in a front-back direction, the second terminal overlaps with the third terminal when viewed in the front-back direction, a first width of the first terminal in the left-right direction is larger than a second width of the second terminal in the left-right direction, a third width of the third terminal in the left-right direction is larger than a fourth width of the fourth terminal in the left-right direction, fifth widths of the multiple fifth terminals in the left-right direction are uniform, sixth widths of the multiple sixth terminals in the left-right direction are uniform, a half of a value obtained by subtracting the fourth width from the first width is defined as a first distance, a half of a value obtained by subtracting the second width from the third width is defined as a second distance, and the first terminal, the second terminal, the third terminal, and the fourth terminal are disposed to satisfy conditions (A) and (B):

(A) (a1) a left-end of the first terminal is positioned to left of a left-end of the fourth terminal, and a distance between the left-end of the first terminal and the left-end of the fourth terminal in the left-right direction is shorter than the first distance, or (a2) the left-end of the first terminal coincides with the left-end of the fourth terminal in the left-right direction, and (B) (b1) a right-end of the second terminal is positioned to left of a right-end of the third terminal, and a distance between the right-end of the second terminal and the right-end of the third terminal in the left-right direction is shorter than the second distance, or (b2) the right-end of the second terminal coincides with the right-end of the third terminal in the left-right direction.

20. A connector, comprising:

multiple terminals; and an insulation member holding the multiple terminals, wherein the multiple terminals include a first terminal, a second terminal, and multiple fifth terminals disposed in a first row extending in a left-right direction, the multiple terminals include a third terminal, a fourth terminal, and multiple sixth terminals disposed in a second row extending in the left-right direction, the first row is positioned in front or back of the second row, the second terminal is disposed to right of the first terminal, the multiple fifth terminals are disposed to right of the first terminal and to left of the second terminal, the third terminal is disposed to right of the fourth terminal, the multiple sixth terminals are disposed to right of the fourth terminal and to left of the third terminal, the first terminal overlaps with the fourth terminal when viewed in a front-back direction, the second terminal overlaps with the third terminal when viewed in the front-back direction, a first width of the first terminal in the left-right direction is larger than a second width of the second terminal in the left-right direction, a third width of the third terminal in the left-right direction is larger than a fourth width of the fourth terminal in the left-right direction, fifth widths of the multiple fifth terminals in the left-right direction are uniform, sixth widths of the multiple sixth terminals in the left-right direction are uniform, a half of a value obtained by subtracting the fourth width from the first width is defined as a first distance, a half of a value obtained by subtracting the second width from the third width is defined as a second distance, and the first terminal, the second terminal, the third terminal, and the fourth terminal are disposed to satisfy conditions (C) and (D):

(C) (c1) a left-end of the fourth terminal is positioned to left of a left-end of the first terminal, and a distance between the left-end of the first terminal and the left-end of the fourth terminal in the left-right direction is shorter than the second distance, or (c2) the left-end of the first terminal coincides with the left-end of the fourth terminal in the left-right direction, and (D) (d1) a right-end of the third terminal is positioned to left of a right-end of the second terminal, and a distance between the right-end of the second terminal and the right-end of the third terminal in the left-right direction is shorter than the first distance, or (d2) the right-end of the second terminal coincides with the right-end of the third terminal in the left-right direction.

* * * * *